US012674929B2

(12) United States Patent
Koike

(10) Patent No.: US 12,674,929 B2
(45) Date of Patent: Jul. 7, 2026

(54) INTEGRALLY MOLDED MULTI-OPTICAL TRANSMISSION SHEET, INTEGRALLY MOLDED MULTI-OPTICAL TRANSMISSION SHEET CONNECTOR AND METHOD FOR MANUFACTURING THE SAME

(71) Applicant: Yasuhiro Koike, Kanagawa (JP)

(72) Inventor: Yasuhiro Koike, Kanagawa (JP)

( * ) Notice: Subject to any disclaimer, the term of this patent is extended or adjusted under 35 U.S.C. 154(b) by 167 days.

(21) Appl. No.: 18/493,464

(22) Filed: Oct. 24, 2023

(65) Prior Publication Data

US 2024/0053529 A1 Feb. 15, 2024

Related U.S. Application Data

(63) Continuation of application No. 16/980,202, filed as application No. PCT/JP2019/010419 on Mar. 13, 2019, now Pat. No. 11,828,977.

(30) Foreign Application Priority Data

Mar. 13, 2018 (JP) ................................. 2018-045877

(51) Int. Cl.
*G02B 6/02* (2006.01)
(52) U.S. Cl.
CPC ................................ *G02B 6/02038* (2013.01)
(58) Field of Classification Search
CPC ....................................................... G02B 6/02
USPC ........................................................ 385/124
See application file for complete search history.

(56) References Cited

U.S. PATENT DOCUMENTS

| | | | |
|---|---|---|---|
| 6,670,979 B2 * | 12/2003 | Inoue | ......................... B41J 2/45 |
| | | | 385/115 |
| 6,690,867 B2 | 2/2004 | Melton et al. | |
| 6,822,997 B2 | 11/2004 | Fujihara et al. | |
| 7,653,278 B2 | 1/2010 | Hamada | |

(Continued)

FOREIGN PATENT DOCUMENTS

| | | | |
|---|---|---|---|
| CN | 101750676 A | 6/2010 | |
| CN | 105705973 A * | 6/2016 | ............... G02B 6/04 |

(Continued)

OTHER PUBLICATIONS

International Search Report issued on Jun. 4, 2019, in PCT/JP2019/010419 Mar. 13, 2019, 5 pages.

(Continued)

*Primary Examiner* — Kaveh C Kianni
(74) *Attorney, Agent, or Firm* — Oblon, McClelland, Maier & Neustadt, L.L.P.

(57) ABSTRACT

An integrally molded multi-optical transmission sheet includes: a sheet-like coated portion formed of plastic; and a plurality of optical transmission regions having a core region formed of plastic, and a clad region formed of plastic and surrounding an outer periphery of the core region, which are provided inside the coated portion to extend along an extending direction of the coated portion, wherein the plurality of optical transmission regions are arranged in a row substantially parallel to each other along a main surface of the coated portion, and in a case where light is incident from one end face side of the plurality of optical transmission regions and transmitted toward the other end face side, a $M^2$ value of emitted light is 1.7 or more.

12 Claims, 12 Drawing Sheets

(56) References Cited

U.S. PATENT DOCUMENTS

| | | | | |
|---|---|---|---|---|
| 8,294,987 B1 * | 10/2012 | van Nuland | ......... | H04N 13/305 |
| | | | | 359/463 |
| 8,611,714 B2 | 12/2013 | Yoshida et al. | | |
| 8,740,432 B2 | 6/2014 | Yalin | | |
| 9,651,754 B2 | 5/2017 | Benjamin et al. | | |
| 9,857,539 B2 | 1/2018 | Barwicz | | |
| 10,107,966 B1 * | 10/2018 | Horibe | ................... | G02B 6/122 |
| 2001/0016104 A1 | 8/2001 | Serizawa | | |
| 2005/0018985 A1 | 1/2005 | Kim et al. | | |
| 2009/0324183 A1 | 12/2009 | Bringuier et al. | | |
| 2012/0051084 A1 * | 3/2012 | Yalin | ......................... | G02B 6/32 |
| | | | | 385/33 |
| 2013/0294725 A1 * | 11/2013 | Levy | ................... | G02B 6/4292 |
| | | | | 385/59 |
| 2014/0023332 A1 | 1/2014 | Nishigaki et al. | | |
| 2014/0192403 A1 * | 7/2014 | Fermann | ............. | H01S 3/06737 |
| | | | | 359/341.1 |
| 2015/0316717 A1 * | 11/2015 | Astratov | ................... | G02B 1/00 |
| | | | | 385/35 |
| 2020/0264365 A1 * | 8/2020 | Koike | ................... | G02B 6/0288 |

FOREIGN PATENT DOCUMENTS

| | | | |
|---|---|---|---|
| EP | 0 472 384 A2 | 2/1992 | |
| FR | 2851053 A1 | 8/2004 | |
| JP | 8-5848 A | 1/1996 | |
| JP | 2003-14992 A | 1/2003 | |
| JP | 2006-163031 A | 6/2006 | |
| JP | 2007-101924 A | 4/2007 | |
| JP | 2007094148 A * | 4/2007 | |
| JP | 2011-95762 A | 5/2011 | |
| JP | 2014-21439 A | 2/2014 | |
| JP | 5419815 B2 | 2/2014 | |
| JP | 2015-28645 A | 2/2015 | |
| KR | 20040088402 A * | 10/2004 | ............. B29C 61/08 |

OTHER PUBLICATIONS

Yamashita et al., "Light Scattering Measurement in PMMA Optical Fibers", Japanese Journal of Applied Physics, 1987, vol. 26, No. 11, pp. L1797-L1799 (4 total pages).

Brandrup et al., "Polymer Handbook", Third Edition, 1989, published by John Wiley&Son, 6 pages.

Otsu et al., "Experimental Method for Polymer Synthesis", 1972, 3 pages (with partial English translation).

Combined Taiwanese Office Action and Search Report issued Feb. 14, 2022, in Taiwanese Patent Application No. 108108556, 8 pages.

Taiwan Office Action issued May 12, 2023, in Taiwanese Patent Application No. 108108556, therein, 9 pages.

Office Action issued Aug. 29, 2023, in corresponding Japanese Patent Application No. 2020-506630 with English translation, 6 pages.

Office Action mailed Aug. 15, 2024, in co-pending U.S. Appl. No. 18/457,918.

Office Action mailed May 29, 2025, in co-pending U.S. Appl. No. 18/457,918.

Final Office Action dated Dec. 23, 2025, issued in counterpart U.S. Appl. No. 18/457,918, (19 pages).

* cited by examiner

INTEGRALLY MOLDED MULTI-OPTICAL TRANSMISSION SHEET, INTEGRALLY MOLDED MULTI-OPTICAL TRANSMISSION SHEET CONNECTOR AND METHOD FOR MANUFACTURING THE SAME

CROSS REFERENCE TO RELATED APPLICATIONS

This application is a continuation Application of U.S. application Ser. No. 16/980,202, filed Sep. 11, 2020, which is a National Stage application of PCT/JP2019/010419, filed Mar. 13, 2019, and claims priority to Japanese Priority Application No. 2018-045877 filed Mar. 13, 2018. The entire contents of the above-identified applications are incorporated herein by reference.

FIELD

The present invention relates to an integrally molded multi-optical transmission sheet, an integrally molded multi-optical transmission sheet connector, and a method for manufacturing the same.

BACKGROUND

In the related art, an optical fiber has been developed and used for the purpose of increasing the distance of high-speed communication in a medium-distance and long-distance trunk line system.

On the other hand, when mainly intended to perform short-distance communication between video devices of 100 m or less at home or the like, an electric cable such as a high-definition multimedia interface (HDMI, registered) has been used.

In recent years, in large-capacity data transmission such as 4K and 8K video for practical broadcasting, the shortage of electric cable transmission capacity, increase in power consumption, and increase in electromagnetic noise have become major problems. Therefore, it has been considered to use an optical fiber capable of transmitting a large-capacity communication signal for short-distance transmission including consumer optical communication at home.

However, when such an optical fiber of the related art was used for short-distance transmission at home or the like, a completely new problem related to noise, which had hardly been considered in the case of long-distance communication, occurred, and thereby it became clear that high-quality high-speed signal transmission becomes difficult due to the influence of this noise.

Some semiconductor laser modules used in optical communication systems employ an optical isolator in order to attenuate reflected return light from an optical fiber so that noise due to the reflected return light is less likely to occur.

Patent Literature 1 discloses a technique of installing, in a semiconductor laser module that employs an optical isolator, a polarizer so as to match a polarization plane of the emitted light, and attenuating the reflected return light by both the polarizer and the optical isolator.

On the other hand, the optical fiber of the related art was used in a state of being a tape core wire in some cases. The tape core wire has a structure in which a plurality of, for example, four optical fibers that are arranged in parallel in a plane and are integrally coated with a resin tape layer so as to surround the outer periphery thereof, and are integrally coated with the integrally coated layer so as to further surround the outer periphery thereof. An MT connector is attached to one end of such a tape core wire, and the tape core wire is connected to a device or another tape core wire.

CITATION LIST

Patent Literature

Patent Literature 1: Japanese Laid-open Patent Publication No. 2003-014992

SUMMARY

Technical Problem

As described above, when the optical fiber of the related art is used for short-distance transmission, there is a new problem related to noise, which makes it difficult to perform high-quality high-speed signal transmission.

In addition, in order to use the tape core wire of the related art to connect to other optical elements (including other tape core wires) such as optical parts and optical devices, for example, when attaching an MT connector, it was necessary to peel off a resin tape layer and an integrally coated layer, remove the optical fibers, and insert each optical fiber into each hole formed in a connector housing of the MT connector one by one. Therefore, there is a problem that the installation of the MT connector is complicated, and work takes time.

The present invention has been made in view of the above, and an object thereof is to provide an integrally molded multi-optical transmission sheet, which is completely different from the optical fiber of the related art, and capable of realizing high-quality high-speed signal transmission for short distance and high workability when connecting to other optical elements, an integrally molded multi-optical transmission sheet connector, and a method for manufacturing the same.

Solution to Problem

To resolve the above problem and attain the object, an integrally molded multi-optical transmission sheet according to an embodiment of the present invention includes: a sheet-like coated portion formed of plastic; and a plurality of optical transmission regions, provided inside the coated portion to extend along an extending direction of the coated portion, having a core region formed of plastic, and a clad region formed of plastic and surrounding an outer periphery of the core region. Further, the plurality of optical transmission regions are arranged in a row substantially parallel to each other along a main surface of the coated portion, and in a case where light is incident from one end face side of the plurality of optical transmission regions and transmitted toward another end face side, a $M^2$ value of emitted light is 1.7 or more.

An integrally molded multi-optical transmission sheet according to an embodiment of the present invention includes: a sheet-like coated portion formed of plastic; and a plurality of optical transmission regions, provided inside the coated portion to extend along an extending direction of the coated portion, having a core region formed of plastic, and a clad region formed of plastic and surrounding an outer periphery of the core region. Further, the plurality of optical transmission regions are arranged in a row substantially parallel to each other along a main surface of the coated portion, and in a case where light is incident from one end face side of the plurality of optical transmission regions and transmitted toward another end face side, when the light output from the another end face side is received by a light receiving element and converted into an electric signal, a maximum noise power density in a low frequency region of a noise spectrum of the electric signal is less than −108 dBm/Hz.

An integrally molded multi-optical transmission sheet according to an embodiment of the present invention includes: a sheet-like coated portion formed of plastic; and a plurality of optical transmission regions, provided inside the coated portion to extend along an extending direction of the coated portion, having a core region formed of plastic, and a clad region formed of plastic and surrounding an outer periphery of the core region. Further, the plurality of optical transmission regions are arranged in a row substantially parallel to each other along a main surface of the coated portion, and the core region of the plurality of the optical transmission regions is formed of a core material with microscopic inhomogeneous correlation length of 100 angstroms or more, and satisfies a single mode condition at a predetermined wavelength.

An integrally molded multi-optical transmission sheet connector according to an embodiment of the present invention includes: the integrally molded multi-optical transmission sheet according to any one of claims 1 to 10; and a ferrule having an insertion hole having an inner shape corresponding to an outer shape of a cross section of the integrally molded multi-optical transmission sheet. Further, at least one end of the integrally molded multi-optical transmission sheet is inserted into the insertion hole.

A method for manufacturing an integrally molded multi-optical transmission sheet according to an embodiment of the present invention includes: a step of supplying a core material to a plurality of regions arranged in a row at intervals in a predetermined direction; a step of supplying a clad material to surround an outer periphery of the core material; a step of supplying a coating material to surround an outer periphery of the clad material; a step of extruding the supplied core material, clad material, and coating material integrally and in a sheet shape to form a main surface in the predetermined direction; and a step of forming an integrally molded multi-optical transmission sheet that includes a sheet-like coated portion formed of the coating material, and a plurality of optical transmission regions having a core region formed of the core material and a clad region formed of the clad material.

The method for manufacturing an integrally molded multi-optical transmission sheet connector according to an embodiment of the present invention includes: inserting one end of the integrally molded multi-optical transmission sheet into an insertion hole of a ferrule having the insertion hole having an inner shape corresponding to an outer shape of a cross section of the integrally molded multi-optical transmission sheet.

Advantageous Effects of Invention

According to the present invention, it is possible to realize high-quality high-speed signal transmission for short distance, and exhibit an effect of achieving high workability when connecting to another optical element.

BRIEF DESCRIPTION OF DRAWINGS

FIG. 13 is a diagram illustrating a measuring system of scattering angle dependence of light scattering intensity.

FIG. 14 is a diagram illustrating the angle dependence of light scattering intensity.

FIG. 15 is a diagram illustrating a noise power density spectrum.

DESCRIPTION OF EMBODIMENTS

Hereinafter, embodiments of the present invention will be described in detail with reference to the drawings. The present invention is not limited to these embodiments.

First Embodiment

Figure 1:
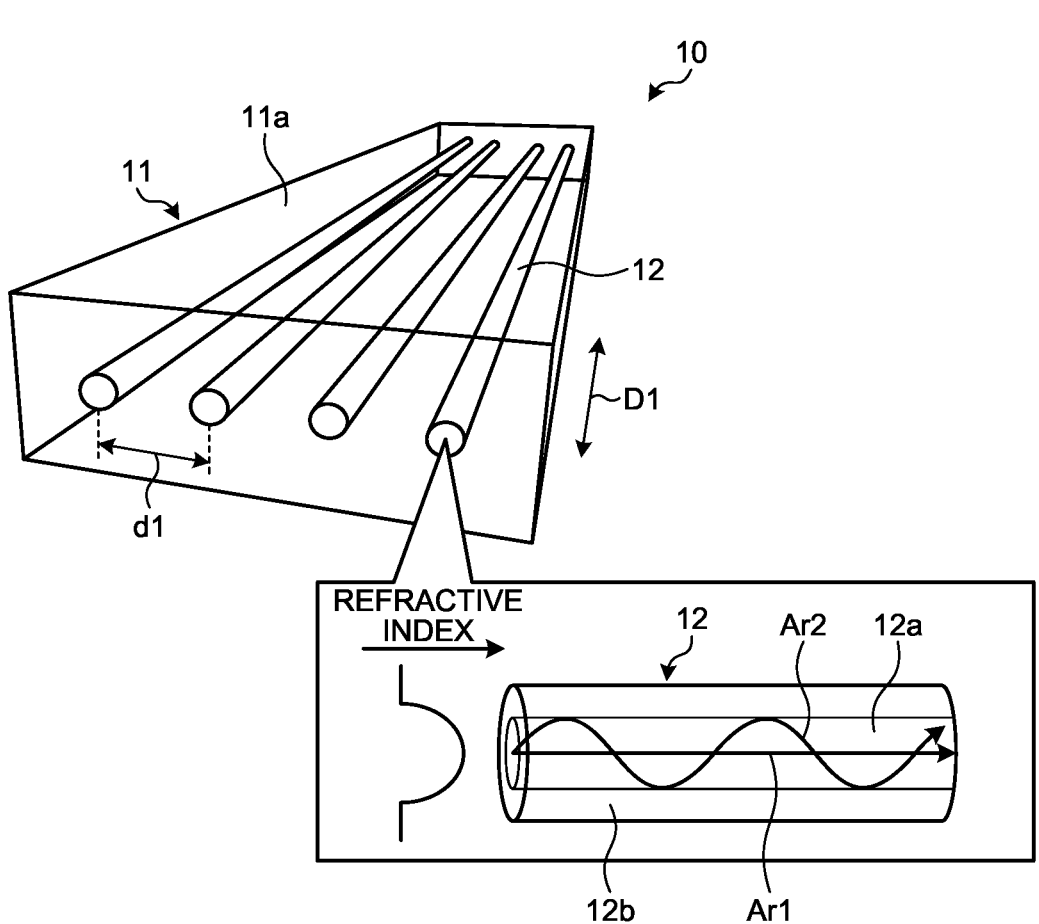
FIG. 1 is a schematic view of an integrally molded multi-optical transmission sheet according to a first embodiment.

FIG. 1 is a schematic view of an integrally molded multi-optical transmission sheet according to a first embodiment. An integrally molded multi-optical transmission sheet 10 includes a coated portion 11 and a plurality of optical transmission regions 12 provided inside the coated portion 11. The integrally molded multi-optical transmission sheet 10 of FIG. 1 has four cores and four optical transmission regions 12, but the number of optical transmission regions 12 is not particularly limited. In the integrally molded multi-optical transmission sheet 10, all the optical transmission regions 12 have the same configuration, but the present invention is not necessarily limited to this, and one or more may be different from other ones.

The coated portion 11 is made of plastic, has a sheet shape, and is stretched in an extending direction D1. The optical transmission regions 12 are provided so as to extend along the extending direction D1, and are arranged in parallel along a main surface 11a of the coated portion 11 in a row. However, as long as the accuracy is within a permissible range, those may not be exactly in parallel, and may be arranged at substantially in parallel.

A solid line frame in FIG. 1 illustrates a specific configuration of the optical transmission region 12. The optical transmission region 12 has a core region 12a made of plastic and having a circular cross section, and a clad region 12b made of plastic and having a circular cross section that surrounds the outer periphery of the core region 12a. The core region 12a and the clad region 12b are formed substantially coaxially.

The core region 12a has a graded index (GI) type (for example, square distribution) refractive index distribution, and the clad region 12b has a lower refractive index than the core region 12a. Since the optical transmission region 12 has such a refractive index distribution, when light propagates in a multi-mode, it propagates linearly as indicated by arrow Ar1 in a fundamental mode and it propagates sinusoidal as indicated by arrow Ar2 in a higher-order mode. As a result, the optical transmission region 12 can suppress the difference in propagation speed between modes and can transmit pulsed light with little distortion. A diameter of the core region 12a is, for example, 50 µm or 62 µm, but is not particularly limited. Furthermore, for example, the diameter of the core region 12a can be controlled to 10 µm or less, and the core region 12a can be configured to satisfy single mode conditions. In addition, there is no limitation to impart a so-called double clad structure in which a layer having a refractive index lower than that of the clad region 12b is further provided outside the clad region 12b.

In addition, the optical transmission regions 12 are arranged at equal distances d1. Here, the distance d1 is the distance between the central axes of the adjacent core regions 12a. However, as long as the accuracy is within a permissible range, the intervals may not be exactly equal, and may be arranged at substantially equal intervals. Furthermore, it is easy to intentionally design the distance d1.

Figure 2:
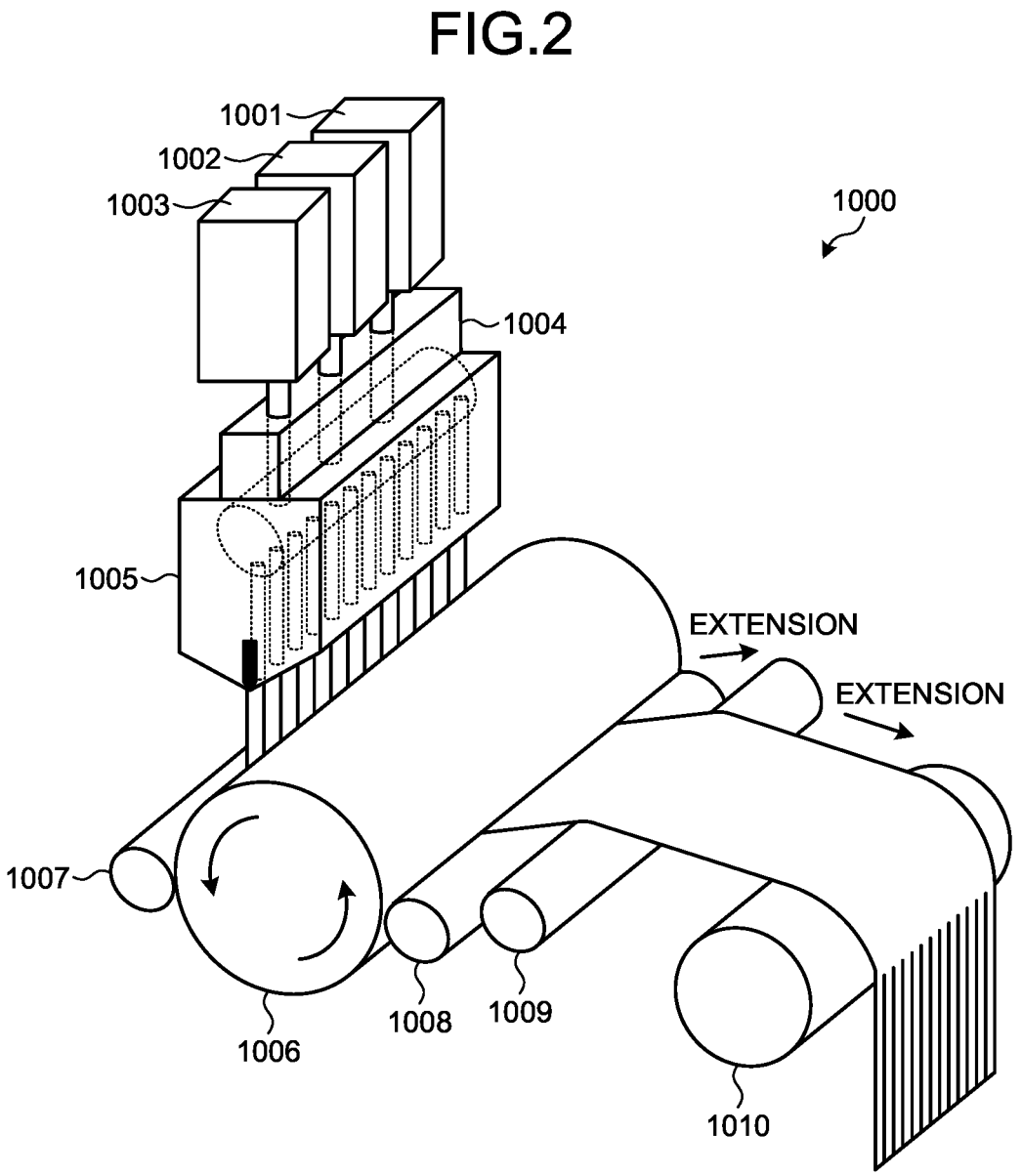
FIG. 2 is a diagram illustrating a method for manufacturing the integrally molded multi-optical transmission sheet.

An example of a method for manufacturing such an integrally molded multi-optical transmission sheet will be described. FIG. 2 is a diagram illustrating a method for manufacturing the integrally molded multi-optical transmission sheet having 12 cores.

A manufacturing apparatus 1000 is provided with extruders 1001, 1002, and 1003, a die 1004, a T-die 1005, a cooling roll 1006, a capstan roll 1007, extension rolls 1008, 1009, and 1010, and a winding roll (not illustrated).

The extruders 1001, 1002, and 1003 are devices that melt a transparent plastic material for optical use at a predetermined temperature and extrude it toward the die 1004. The extruder 1001 extrudes a core material that is a material of the core region 12a of the integrally molded multi-optical transmission sheet 10. The extruder 1002 extrudes and supplies a clad material that is a material of a clad region 12b of the integrally molded multi-optical transmission sheet 10. The extruder 1003 extrudes and supplies a coating material that is a material of the coated portion 11 of the integrally molded multi-optical transmission sheet 10. As these extruders 1001, 1002 and 1003, known plastic material extruders can be used. Generally, a screw extruder is used, and melt extrusion may be performed at a pressure of nitrogen gas or the like.

Figure 3A:
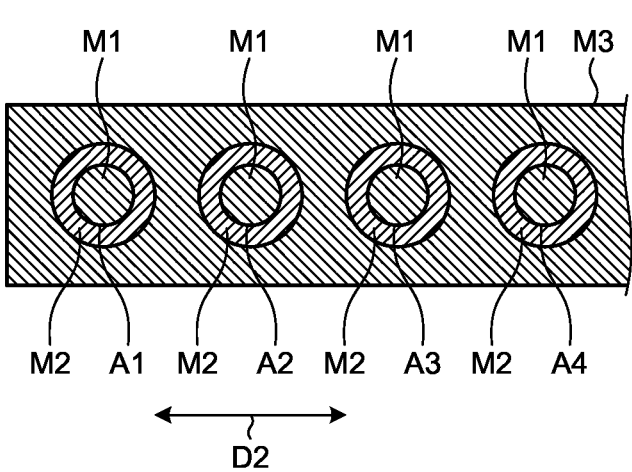
FIG. 3A is a diagram illustrating a supply state of each material in a die.

Each plastic material is supplied to the die 1004 via different flow paths. At this time, as illustrated in FIG. 3A, as viewed from the direction of material flow, the die 1004 supplies, with respect to the T-die 1005, a core material M1 to a plurality of regions (regions A1, A2, A3, and A4 are illustrated in FIG. 3A) arranged in a row at intervals in the direction D2, supplies a clad material M2 so as to surround the outer circumference of each core material M1 in each area, and then supplies a coating material M3 so as to surround the outer circumference of the clad material. The core material M1, the clad material M2, and the coating material M3 merge, but do not mix and flow separately.

Figure 3B:
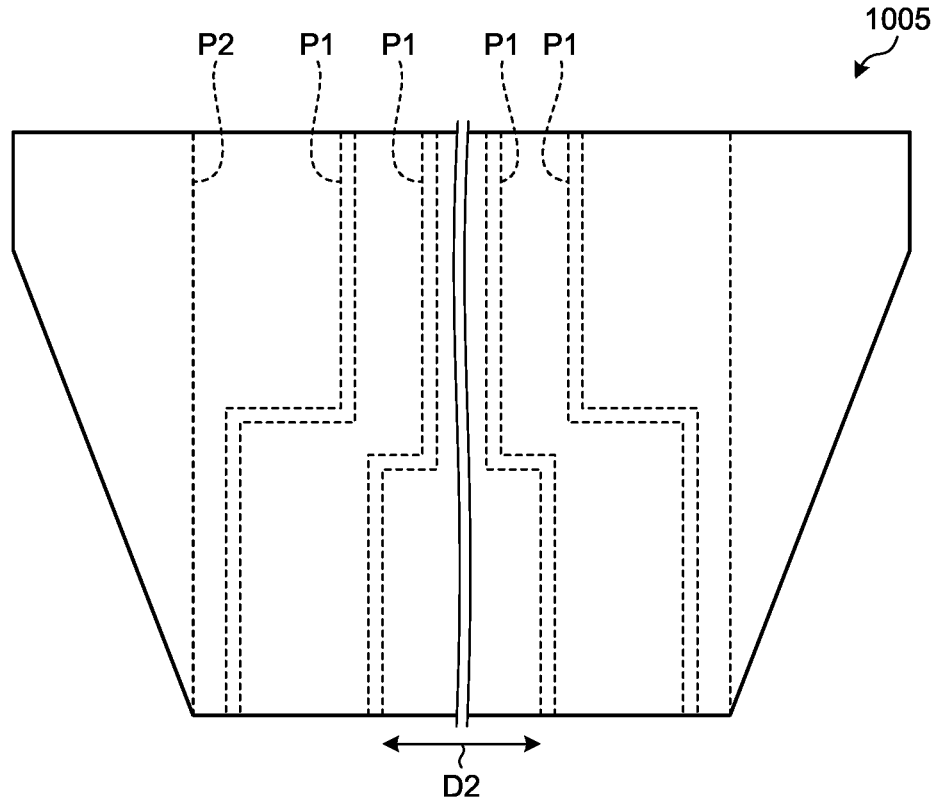
FIG. 3B is a diagram illustrating a structure of a T-die.

As illustrated in FIG. 3B, the T-die 1005 includes a flow path P1 in which the core material M1 and the clad material M2 flow in a double structure and a flow path P2 in which the coating material M3 flows. The flow path P1 is made of, for example, a pipe material that passes through the flow path P2, and has a nozzle-shaped tip end. The T-die 1005 integrally extrudes the core material M1, the clad material M2, and the coating material M3 from the slit-shaped discharge port into a sheet shape. As a result, the main surface of the extruded sheet-like body is formed along the direction D2 in which the core materials M1 are arranged in a row.

In the process in which the core material M1 merges with the clad material M2 and then discharged from the T-die 1005, a refractive index imparting material that is a dopant of the core material M1 spreads in a stepwise manner in the radial direction, and thereby a GI type refractive index distribution is formed.

Returning to FIG. 2, the extruded sheet-like body is brought into contact with the surface of the cooling roll 1006 by the capstan roll 1007 to be cooled uniformly.

The fully cooled sheet-like body is further extended by extension rolls 1008, 1009, and 1010 at a desired ratio so as to manufacture an integrally molded multi-optical transmission sheet. The manufactured optical transmission sheet is wound on a winding roll.

Here, by designing the position of the flow path P2 in the T-die 1005 with high accuracy, the distance d1 of the arrangement of the four optical transmission regions 12 in the integrally molded multi-optical transmission sheet 10 can be matched with a desired distance with high accuracy.

Figure 4:
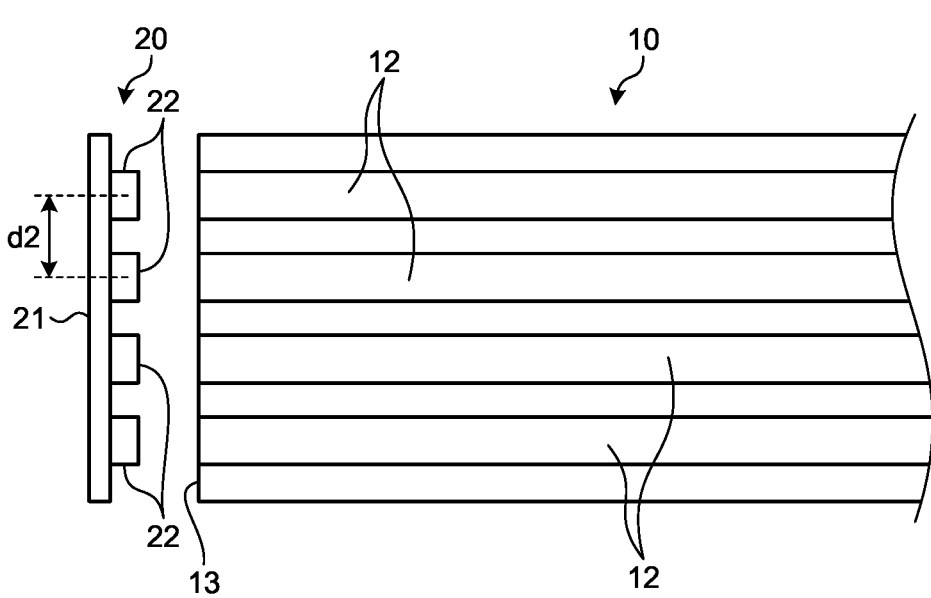
FIG. 4 is a diagram illustrating an optical connection state between the integrally molded multi-optical transmission sheet and a VCSEL array.

For example, FIG. 4 is a diagram illustrating an optical connection state between the integrally molded multi-optical transmission sheet 10 having four cores and a Vertical Cavity Surface Emitting Laser (VCSEL) array 20. In the VCSEL array 20, four VCSELs 22 are arranged in a row on a substrate 21 at an arrangement distance d2. The arrangement distance d2 is, for example, 250 µm. The VCSEL array 20 is an example of a light source that emits light that is incident on each of the four optical transmission regions 12.

As illustrated in FIG. 4, an end face 13 of the integrally molded multi-optical transmission sheet 10 and the VCSEL array 20 are brought close to each other, and the integrally molded multi-optical transmission sheet 10 and the VCSEL array 20 are optically connected to each other via an optical coupling system (not illustrated) such as a lens. At this time, the accuracy of matching the distance d1 in the integrally molded multi-optical transmission sheet 10 with the arrangement distance d2 in the VCSEL array 20 is a factor that determines the quality of optical coupling.

In the integrally molded multi-optical transmission sheet 10, the distance d1 can be made equal to the arrangement distance d2 with high accuracy, and thus high quality optical coupling can be achieved.

Further, in the tape core wire of the related art, it was necessary to peel off the resin tape layer and the integrally coated layer, take out the optical fibers, and align the optical fibers one by one with the VCSEL array 20; whereas, in the integrally molded multi-optical transmission sheet 10, it does not require complicated work when optically connecting to the VCSEL array 20. Therefore, the integrally molded multi-optical transmission sheet 10 has high workability for optically connecting to a light source such as the VCSEL array 20.

Figure 5:
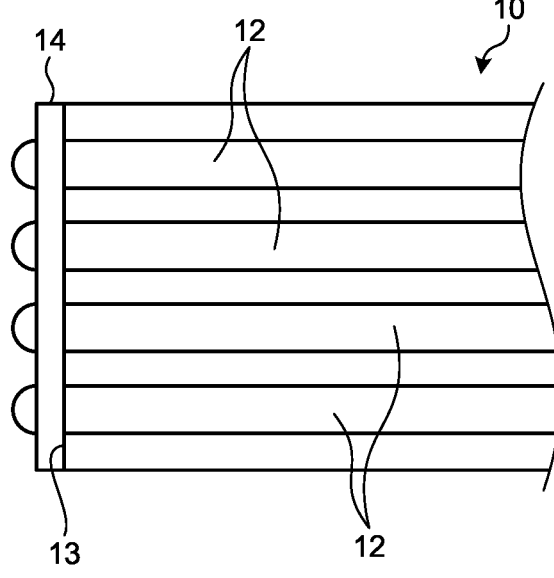
FIG. 5 is a schematic view of an optical transmission sheet having a microlens array on an end face.

Further, a microlens array 14 may be provided on the end face 13 of the integrally molded multi-optical transmission sheet 10 as illustrated in FIG. 5. The microlens array 14 is one in which lenses such as a collimator lens and a condenser lens are formed corresponding to the four optical transmission regions 12, and has an effect of increasing coupling efficiency between the integrally molded multi-optical transmission sheet 10 and other optical elements. The microlens array 14 is made of a transparent optical material such as a glass material or a plastic material. Further, a coating layer for preventing reflection or protecting the end face may be provided on the end face 13 of the integrally molded multi-optical transmission sheet 10.

Second to Fourth Embodiments

Figure 6A:
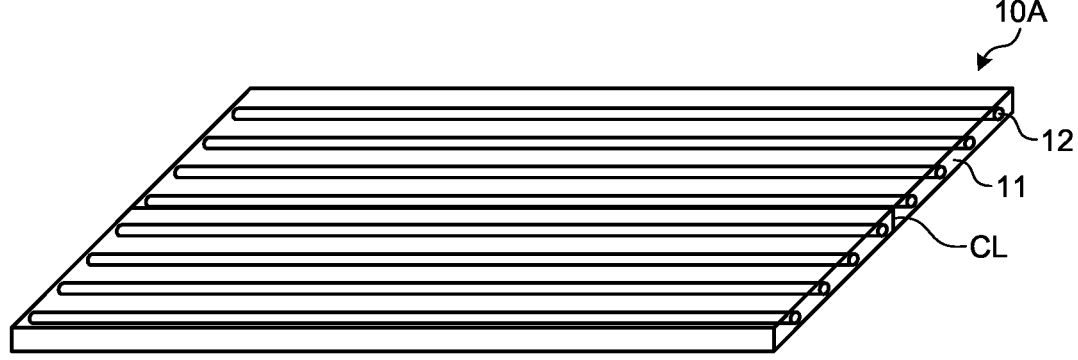
FIG. 6A is a schematic view of an integrally molded multi-optical transmission sheet according to a second embodiment.
Figure 6B:
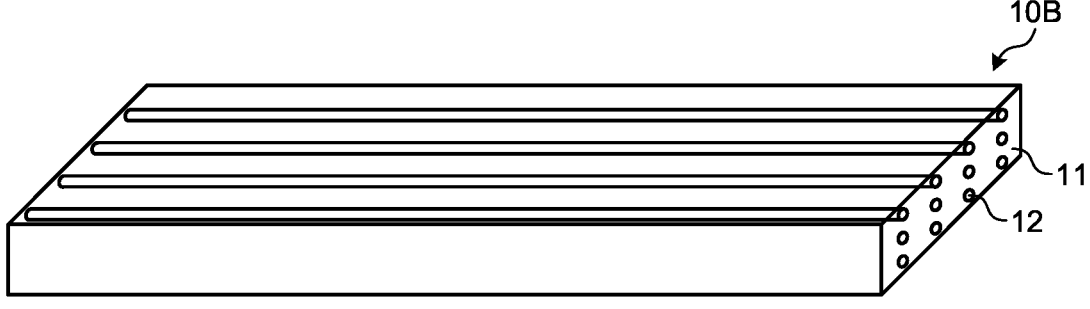
FIG. 6B is a schematic view of an integrally molded multi-optical transmission sheet according to a third embodiment.
Figure 6C:
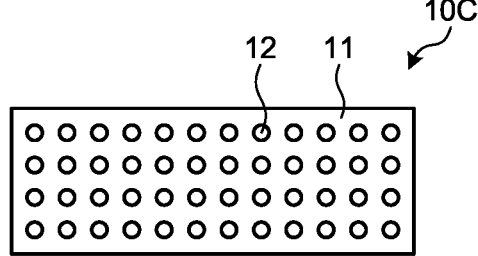
FIG. 6C is a schematic view of an integrally molded multi-optical transmission sheet according to a fourth embodiment.

FIGS. 6A, 6B, and 6C are schematic views of the integrally molded multi-optical transmission sheet according to second to fourth embodiments. Each of the integrally molded multi-optical transmission sheets 10A, 10B, and 10C includes a coated portion 11 and a plurality of optical transmission regions 12 provided inside the coated portion 11. Since the coated portion 11 and the optical transmission region 12 have the same configuration as the corresponding elements of the integrally molded multi-optical transmission sheet 10, the description thereof will be omitted.

Eight optical transmission regions 12 are arranged in a row in an integrally molded multi-optical transmission sheet 10A. In an integrally molded multi-optical transmission sheet 10B, a structure in which four optical transmission regions 12 are arranged in a row is stacked in three layers.

Similar to the integrally molded multi-optical transmission sheet 10, the integrally molded multi-optical transmission sheets 10A and 10B have high workability when optically connected to other optical elements. Further, the integrally molded multi-optical transmission sheet 10A can be made into two integrally molded multi-optical transmission sheets 10 having four cores by cutting along a cutting line CL. Since the integrally molded multi-optical transmission sheet 10A is made of plastic, such cutting can be easily performed using a cutting tool such as a cutter.

As an additional embodiment of the present invention, an optical transmission sheet in which the optical transmission regions are included as multiples of two, such as 16 and 24. In this case, the optical transmission regions may be arranged in a row or may be stacked in a plurality of two or more layers. The integrally molded multi-optical transmission sheet 10C of FIG. 6C has 48 optical transmission regions 12 (12'4 layers) arranged inside the coated portion 11. Here, when the distance between the centers of the optical transmission regions 12 is set to 250 μm, and the shortest distance from the outer edge of the outermost optical transmission region 12 to the outer edge of the coated portion 11 is set to 125 μm, the cross-section size of the integrally molded multi-optical transmission sheet 10C is extremely small with a width of 3000 μm and a height of 1000 μm.

Figures 7A, 7B:
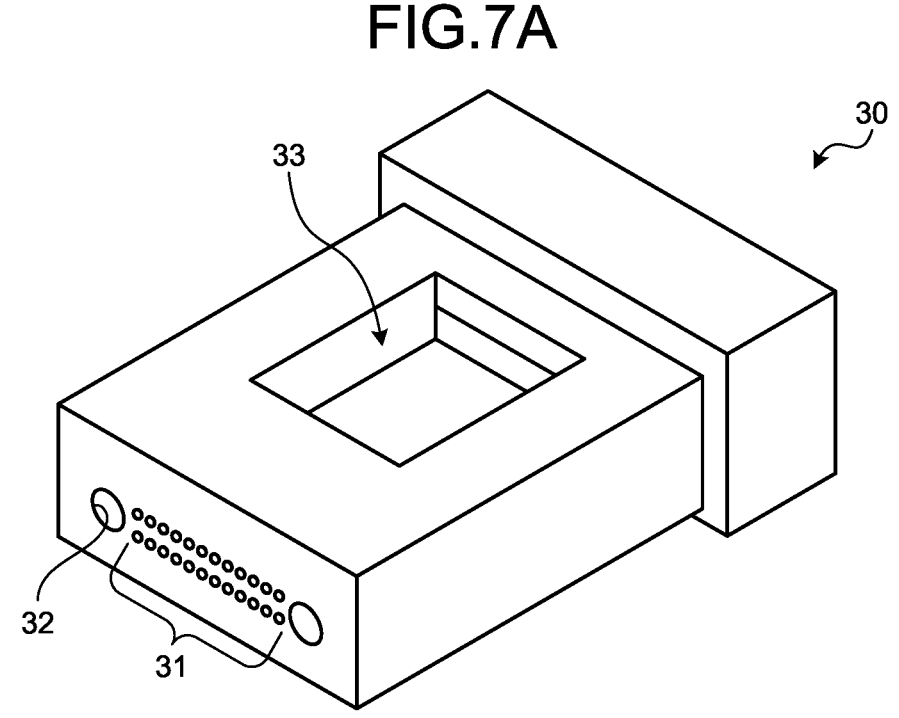
FIG. 7A is a schematic view of a ferrule for a tape core wire in the related art.
FIG. 7B is a schematic view of a ferrule for a tape core wire in the related art.

Here, the ferrule 30 for a tape core wire having 24 cores in the related art, illustrated in FIGS. 7A and 7B, has 24 optical fiber insertion holes (12×2 layers) 31, and a guide pin hole 32, and a hole 33 is formed in the upper portion. 12 upper guide grooves 34 and 12 lower guide grooves 35 for disposing the optical fiber are formed in the hole 33. When this ferrule 30 was attached to the tape core wire having 24 cores, it was required to perform extremely complicated work in which the resin tape layer and the integrally coated layer of the tape core wire having 24 cores were peeled off, the tape core wire having 24 cores were individually taken out, and the optical fibers were placed one by one in the upper guide groove 34 and the lower guide groove 35 to be inserted into the respective optical fiber insertion holes 31.

Figure 8A:
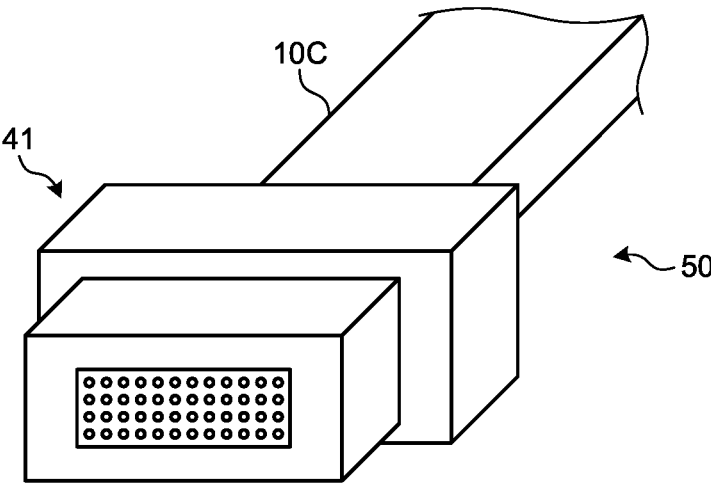
FIG. 8A is a diagram illustrating an integrally molded multi-optical transmission sheet connector.
Figure 8B:
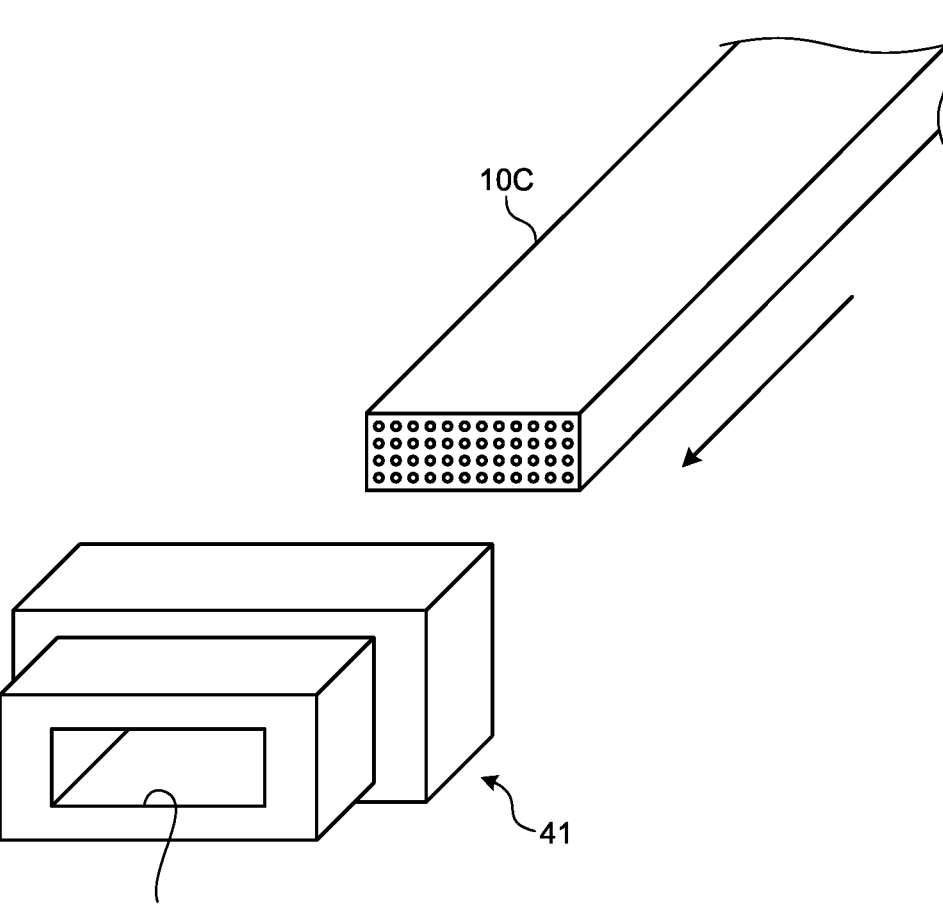
FIG. 8B is a diagram illustrating a method for manufacturing the integrally molded multi-optical transmission sheet connector.

On the other hand, if the integrally molded multi-optical transmission sheet 10C is used, the integrally molded multi-optical transmission sheet connector 50 can be configured very easily as illustrated in FIGS. 8A and 8B. A ferrule 41 has an insertion hole 41*a* having an inner shape corresponding to the outer shape of the cross section of the integrally molded multi-optical transmission sheet 10C. One end of the integrally molded multi-optical transmission sheet 10C is inserted into the insertion hole 41*a*. When manufacturing the integrally molded multi-optical transmission sheet connector 50, as illustrated in FIG. 8B, one end of the integrally molded multi-optical transmission sheet 10C is inserted into the insertion hole 41*a* of the ferrule 41 and fixed with an adhesive or the like. On the side surface of the ferrule 41, a hole communicating with the insertion hole 41*a* and injecting an adhesive from the insertion hole 41*a* may be formed. The ferrule 41 may be compatible with, for example, an MT ferrule, and the integrally molded multi-optical transmission sheet connector 50 may be configured to be connectable to a MT ferrule-attached tape core wire having 48 cores.

When manufacturing the integrally molded multi-optical transmission sheet connector 50, unlike the tape core wire in the related art, there is no need to perform the work in which the resin tape layer and the integrally coated layer are peeled off, the optical fibers are taken out, and the optical fibers are inserted one by one into each of the optical fiber insertion holes of the ferrule. Therefore, the integrally molded multi-optical transmission sheet connector 50 has high workability for optically connecting to a light source such as the VCSEL array.

Moreover, in the integrally molded multi-optical transmission sheet 10C, the distance d1 of the arrangement of the 48 optical transmission regions 12 can be made with high accuracy. As a result, the integrally molded multi-optical transmission sheet connector 50 has a high yield and enables high-quality optical coupling. It is also possible to directly connect the integrally molded multi-optical transmission sheet according to the embodiment of the present invention to the light source and the detector.

Characteristics of Integrally Molded Multi-Optical Transmission Sheet

Next, the characteristics of the integrally molded multi-optical transmission sheet of the present invention will be described more specifically by taking the integrally molded multi-optical transmission sheet 10 as an example. The integrally molded multi-optical transmission sheet 10 has an $M^2$ value of the emitted light beam of 1.7 or more when light is incident from one end face side of the optical transmission region 12 and then the light is transmitted toward the other end face side. Further, the length in the extending direction D1 is preferably 200 m or shorter, more preferably 100 m or shorter, and further preferably 50 m or shorter.

Figure 9:
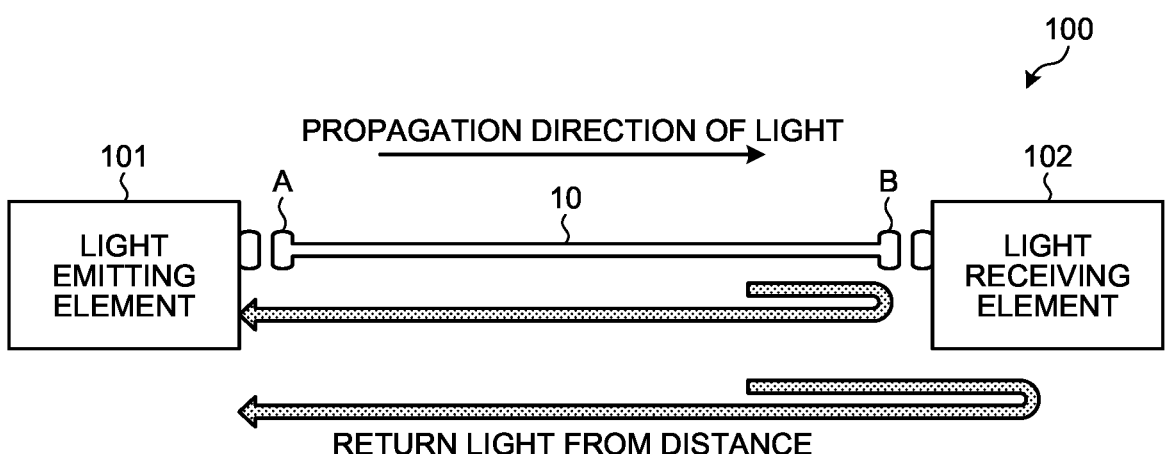
FIG. 9 is a diagram illustrating an optical link for short-distance communication using the integrally molded multi-optical transmission sheet.

FIG. 9 is a diagram illustrating an optical link 100 for short-distance communication using the integrally molded multi-optical transmission sheet 10. The return light is light returning from a distance in such a manner that a part of the light which is emitted from a light emitting element 101 such as VCSEL, incident and propagated from one end face side (end A) which is the end face on the light emitting element side of the integrally molded multi-optical transmission sheet 10 is reflected on the other end face side (end B, a light receiving element (PD), or the connector) which is the end of the integrally molded multi-optical transmission sheet 10 on the side of the light receiving element 102, and returns to the light emitting element side again. As the light returning to the light emitting element side, return light from the vicinity of the light emitting element (such as the end A) may be considered, and it is also considered that the return light from such a vicinity does not cause the light emitting element to become unstable.

After conducting intensive research, the inventors of the present invention have found that fluctuations at a frequency lower than the relaxation frequency of the light emitting element, which is caused by return light from a distance, are the main causes of deterioration of transmission quality particularly in short-distance transmission.

The inventors of the present invention have also focused on the $M^2$ value that has been used in the related art as a parameter representing the quality of a light beam as a factor representing the characteristics of the optical fiber that can reduce the return light from a distance.

The $M^2$ value is a parameter that expresses the quality relating to the degree of focusing of the light beam by using a wavelength $\lambda$, a beam radius W (D4$\sigma$) defined by using a second moment, and a beam divergence angle $\theta$ (half angle) based on the Gaussian beam (TEM00 mode), which is expressed by Equation (1):

[Equation 1]

$$M^2 = \frac{\pi W \theta}{\lambda} \quad (1)$$

Here, the beam radius W (D4$\sigma$) can be obtained from the near-field image (Near Field Pattern (NFP)) of the emitted laser light, and the divergence angle $\theta$ (half angle) is the far-field image (Far Field Pattern (FFP)) of the laser light. An ideal Gaussian beam has an $M^2$ value of 1.

In the case of laser light emitted from the optical fiber, the $M^2$ value thereof depends on the propagation mode. In the single mode optical fiber, since there is only one propagation mode (HE11 mode), the $M^2$ value does not change depending on the length due to the light scattering or the like. On the other hand, in a multi-mode optical fiber with multiple propagation modes, the $M^2$ value of the emitted light is a superposition of modes with different $M^2$ values, and as higher-order mode components increase due to mode coupling caused by the light scattering (the worse the value), the $M^2$ value becomes larger and the beam quality becomes poorer. As a result, not only the radiation loss becomes large, but also all the light emitted from the optical fiber cannot be received, so that the transmission quality of the optical signal deteriorates. For this reason, it has been considered that keeping the $M^2$ value of the laser light emitted from the multi-mode optical fiber small is important in order to maintain the transmission quality of the optical signal.

As a result of intensive research on the use of the $M^2$ value, which has been used as a parameter representing the quality of a laser beam in the related art, as a design value of a multi-mode optical fiber, the inventors of the present invention have found that in particular, in the case of short-distance communication, the use of an optical fiber of which $M^2$ value is controlled to a specific value can reduce the influence of return light from a distance.

Furthermore, the inventors of the present invention have found that this finding can also be applied to the optical transmission region 12 of the integrally molded multi-optical transmission sheet 10.

Although not being limited to any theory, when the optical transmission region 12 has a microscopic inhomogeneous structure with a correlation length of several hundred angstroms, it is considered that it is possible to increase mode coupling due to forward scattering, and to effectively control the $M^2$ value of the light emitted from the optical transmission region 12 while controlling the propagation loss. By using the integrally molded multi-optical transmission sheet 10 having the optical transmission region 12 such that the $M^2$ value is controlled to a specific value, it is considered that the noise reduction due to the reduction of the influence of the reflected return light from a distance becomes more dominant than the transmission loss caused by the increase of the higher-order modes due to the mode coupling, and thereby the transmission quality is improved.

Figure 10:
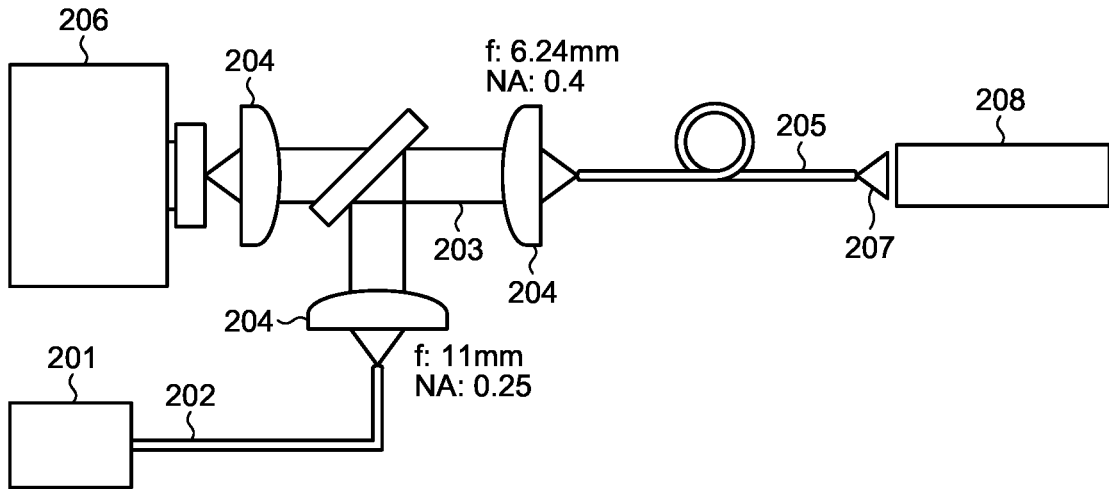
FIG. 10 is a diagram illustrating a measuring system for NFP and FFP.

FIG. 10 is a diagram illustrating a measuring system for NFP and FFP. Emitted light 203 (mode field diameter of 5.3 µm) from a polarization-maintaining single-mode optical fiber 202 pigtail (APC polished) of a DBR laser 201 with a single wavelength of 850 nm was incident on an optical fiber 205 using a lens 204. At this time, light is made to incident on the center of the core of the optical fiber 205 through the lens 204 by using a microscopic observation by a CCD camera 206, and evaluation is performed under the central excitation condition. Then, the NFP of the light 207 emitted from the end face opposite to the incident end face of the optical fiber 205 is measured by a NFP measuring device 208 (A6501 available from Hamamatsu Photonics K.K.) and the FFP is measured by a FFP measuring device (A3267-12 available from Hamamatsu Photonics K.K.), and the beam diameter W (D$\sigma$4) and the divergence angle $\theta$ (half angle) defined by using the second moment are specified. With this, the $M^2$ value can be calculated. Note that this measuring system can also be used for measuring NFP and FFP of the integrally molded multi-optical transmission sheet 10, and thereby the $M^2$ value can be calculated.

Figure 11:
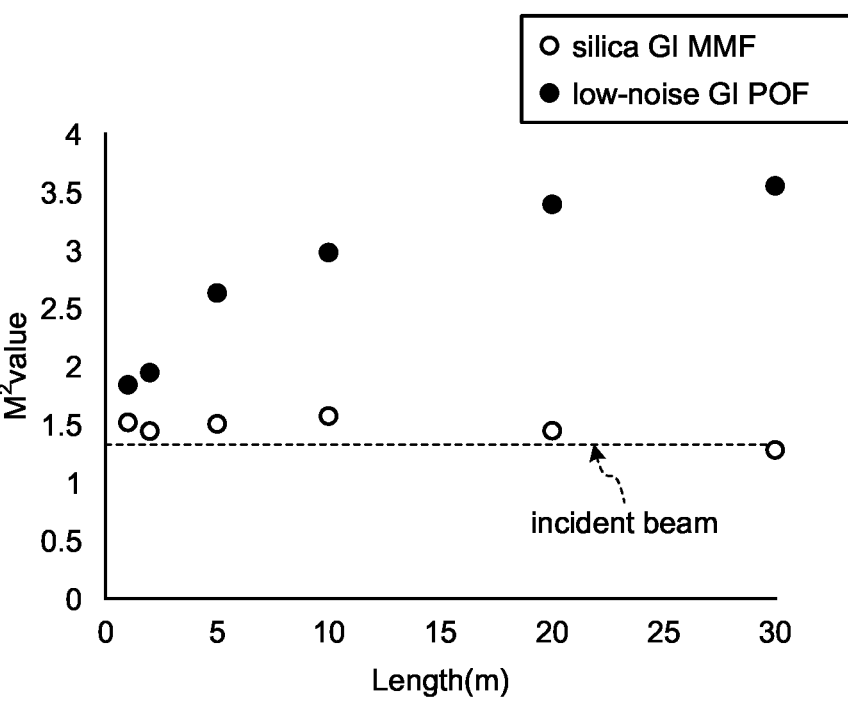
FIG. 11 is a diagram illustrating $M^2$ values for two multi-mode optical fibers.

FIG. 11 is a diagram illustrating the $M^2$ value regarding a multi-mode optical fiber with an $M^2$ value of 1.7 or more (low-noise GI POF) and a silica glass-based multimode optical fiber (silica GI MMF) in the related art, in the central excitation by an approximate Gaussian beam of linear polarization. The incident light source is linearly polarized single frequency laser (DBR852P available from Thorlabs) of a polarization maintaining single mode optical fiber (SMF) pigtail output. The $M^2$ value of the incident light is 1.32. The light emitted from this fiber pigtail was collimated and condensed by a lens and made incident on the center of the evaluation fiber. With this experimental system, it is possible to measure the transition of the change in $M^2$ value due to the mode coupling via the light scattering from the lowest-order mode that can be approximated to the Gaussian beam excited at the time of incidence, and it can be used as an index indicating the reduction effect of the noise of the low-noise GI POF. The reason for that the emission end face of the pigtail is APC is that it does not destabilize the laser, which enables stable measurement of the $M^2$ value. A horizontal axis represents the length of the optical fiber and a vertical axis represents the $M^2$ value.

In the optical fiber of the related art, regardless of the length of the optical fiber, the $M^2$ value is almost constant around $M^2=1.3–1.5$. On the other hand, in the case of low-noise GI POF, it is found that $M^2=1.7$ or more, and the $M^2$ value increases as the length of the optical fiber increases. Also in the integrally molded multi-optical transmission sheet 10, $M^2=1.7$ or more, and the $M^2$ value increases as the length increases.

In the related art, mainly in the field of laser processing, from the viewpoint of obtaining a stable and high-quality output light beam that does not depend on the length, the $M^2$ value is small, and the optical fiber of which $M^2$ value does not increase even if the length of the optical fiber increases is considered to be desirable. Even in optical communication using a multi-mode optical fiber, naturally, the transmission loss increases as the $M^2$ value increases, and therefore similar characteristics are required. The inventors of the present invention have surprisingly found that in a case of short-distance transmission using a multi-mode optical fiber, when the $M^2$ value is relatively large, the influence of reflected return light from a distance is reduced rather than the transmission loss, thereby improving the transmission quality. Then, this result can also be applied to the integrally molded multi-optical transmission sheet 10.

The magnitude of the $M^2$ value can be controlled by the type of material forming the core region 12a in the optical transmission region 12 in the integrally molded multi-optical transmission sheet 10, the core refractive index distribution, and the manufacturing conditions of the integrally molded multi-optical transmission sheet 10. In addition, depending on the laser diameter of the laser to be used and the incident conditions, the $M^2$ value of the emitted light measured according to the experimental system and the evaluation conditions is used as a reference to evaluate so that evaluation and control of the $M^2$ value due to the microscopic inhomogeneous structure can be performed with good reproducibility. There is basically no factor that can cause the fluctuation of the $M^2$ value in the optical system, and as the laser diameter changes, the divergence angle becomes narrower, and the product is preserved, and therefore, it does not affect the $M^2$ value. For this reason, it is considered that the only factor that can cause the fluctuation of the $M^2$ value is the wavelength.

The integrally molded multi-optical transmission sheet 10 has an $M^2$ value of 1.7 or more at the lower limit of practically usable length. When the $M^2$ value is smaller than 1.7, the transmission quality is deteriorated due to the influence of the reflected return light, which is not preferable.

Further, the integrally molded multi-optical transmission sheet 10 has a length of, for example, 200 m or less, and preferably has an $M^2$ value of 5.0 or less at the upper limit of the length to be used. If the $M^2$ value is larger than 5.0, the transmission loss caused by the increase of higher-order modes becomes large, which is not preferable.

The length of the integrally molded multi-optical transmission sheet 10 is preferably 200 m or less, more preferably 100 m or less, and further preferably 50 m or less. If the length is excessively long, the effect of scattering loss due to forward scattering becomes larger than the effect of reducing the return light, and the transmission quality is rather deteriorated.

As described above, the $M^2$ value of the integrally molded multi-optical transmission sheet 10 can be obtained depending on the type of core material and manufacturing conditions thereof.

In order to increase the $M^2$ value, for example, it is considered that the core region 12a has a microscopic inhomogeneous structure with a correlation length of approximately several hundred angstroms. With this, it possible to increase the forward scattering different from so-called Rayleigh scattering observed in a silica glass optical fiber. As a result, it is possible to induce effective mode coupling and reduce noise while controlling the propagation loss.

For example, an acrylic polymer has intramolecular and intermolecular interactions due to ester groups present in the molecule. In contrast, a perfluorinated polymer such as dioxolene does not have such an ester group. Therefore, the intramolecular and intermolecular interaction is smaller than that of an acrylic polymer. Due to this difference, the conformation of the polymer chain itself changes, and the size of the inhomogeneous structure and the refractive index fluctuation can be controlled. In any case, the polymer is generally an assembly of molecular coils having a radius of gyration on the order of hundreds of angstroms, but silica glass without such molecules does not have a microscopic inhomogeneous structure.

Alternatively, as another characteristic of the integrally molded multi-optical transmission sheet 10, in the integrally molded multi-optical transmission sheet 10, in a case where light is incident from one end face side of the optical transmission region 12 and transmits the light toward the other end face side, when the light output from the other end face side is received by the light receiving element and converted into an electric signal, the maximum noise power density in the low frequency region of the noise spectrum of the electric signal is less than –108 dBm/Hz.

Figure 12:
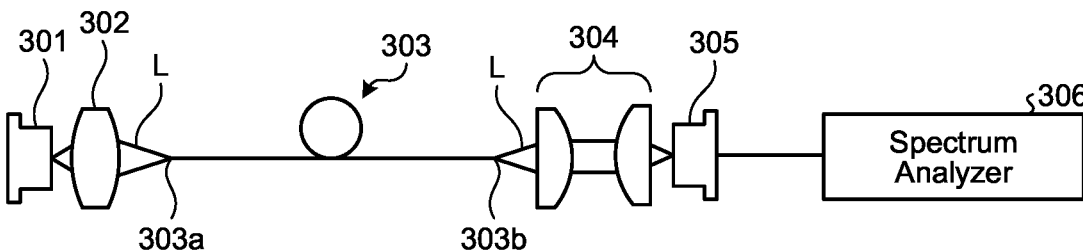
FIG. 12 is a diagram illustrating an experimental system of a short-distance optical link.

The inventors of the present invention have constructed an experimental system of an optical link as illustrated in FIG. 12 and conducted an experiment. Specifically, the laser light L output from VCSEL (oscillation wavelength of 850 nm, 14 Gbps, hereinafter, referred to as VCSEL301) is input to a first end face 303a of an optical transmission body 303 by a condenser lens 302, and propagates toward a second end face 13b. Then, the laser light L output from a second end face 303b of the optical transmission body 303 was input to a PD 305 through a condenser lens system 3044. The current signal output from the PD 305 was analyzed by a spectrum analyzer 306.

Then, it has been found that when using a silica optical fiber having a length of 1 m (GI type multi-mode optical fiber (MMF)) as the optical transmission body 303, a substantially periodic noise peak appears in a low frequency region (for example, a region of 1 GHz or less).

The inventors of the present invention have found that such a periodic noise peak is caused by a part of the laser light L which is reflected by the reflection surface on the far end side from the VCSEL 301 which is a light source, that is, a surface of the second end face 303b or PD 305, and returns to the VCSEL301 as return light, causing unstable operation of the VCSEL301. On the other hand, it was considered that the reflection from the VCSEL 301 on the near end side, that is, the reflection from the first end face 303a does not cause such an unstable operation of the VCSEL 301.

Therefore, in order to suppress the generation of noise peaks caused by such reflection from the far end side, as a result of intensive research regarding the characteristics of the optical fiber, it was found that in the optical fiber manufactured using a certain kind of material, the substantially periodic noise peak in a low frequency region is suppressed. The inventor of the present invention has conducted further intensive research, and has conceived that in the optical fiber manufactured using a material with microscopic inhomogeneous correlation length of 100 angstroms or more, the substantially periodic noise peak in the low frequency region is suppressed.

Regarding whether the material with microscopic inhomogeneous correlation length for manufacturing the optical fiber is 100 angstroms or more, it can be determined by irradiating an optical fiber preform with light and measuring the angle dependence of the light scattering intensity. Therefore, the optical fiber preform can be selected from the measurement result of the angle dependence so that the optical fiber capable of suppressing the substantially periodic noise peak in the low frequency region can be manufactured.

Figure 13:
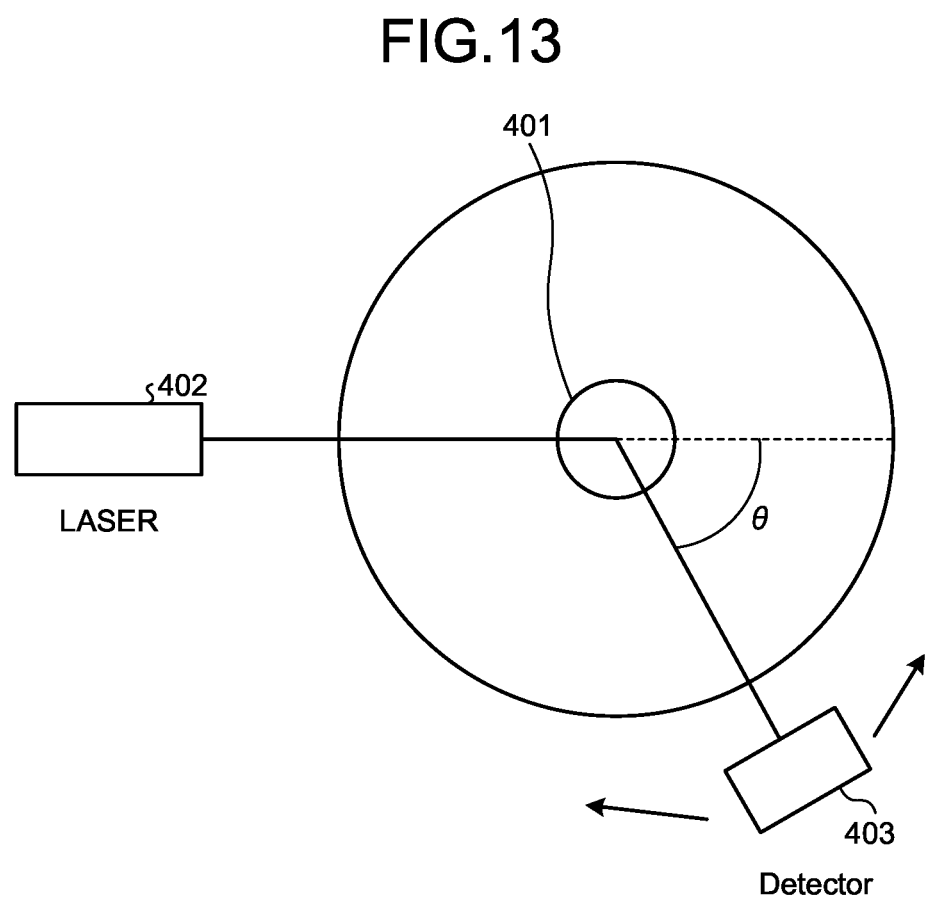

FIG. 13 is a diagram illustrating an example of the measuring system of scattering angle dependence of light scattering intensity. As illustrated in FIG. 13, a cylindrical polymer bulk 401 of the optical fiber preform is produced, and the laser light L from a laser light source 402 is irradiated from the side surface of the cylindrical polymer bulk 401, and the light scattering intensity is measured by the light receiving element 403. By moving the light receiving element 403 so as to revolve around the cylindrical polymer bulk 401, the angle $\theta$ dependence of the light scattering intensity can be measured.

The optical fiber is preferably 200 m or shorter, more preferably 100 m or shorter, and further preferably 50 m or shorter. This is because if optical fiber is excessively long, the increase in transmission loss accompanying the nonlinear distortion reduction effect due to the increase in higher-order mode components exceeds the effect of suppressing the influence of return light.

Here, by manufacturing the optical fiber using the material with microscopic inhomogeneous correlation length of 100 angstroms or more, it is possible to increase forward scattering different from Rayleigh scattering. As a result, it is considered that it is possible to induce effective mode coupling and reduce noise while controlling the propagation loss.

Furthermore, the above founding can also be applied to the integrally molded multi-optical transmission sheet 10. That is, in the integrally molded multi-optical transmission sheet 10 manufactured using a core material having a correlation length of microscopic inhomogeneity of the material of 100 angstroms or more, the substantially periodic noise peak in the low frequency region is suppressed. In addition, the integrally molded multi-optical transmission sheet 10 is preferably 200 m or less, more preferably 100 m or less, and further preferably 50 m or less. When measuring the scattering angle dependence of the light scattering intensity, a rod-shaped core material may be used instead of the optical fiber preform. In the integrally molded multi-optical transmission sheet having the above-described microscopic inhomogeneous structure unique to the polymer, it is preferable that the maximum noise power density is less than −108 dBm/Hz. Silica optical fibers, on the other hand, are considered to have a maximum noise power density above this value. An integrally molded multi-optical transmission sheet 10 manufactured by using a core material with microscopic inhomogeneous correlation length of 100 angstroms or more may be configured to satisfy the single mode condition at a predetermined wavelength by, for example, controlling the diameter of the core region 12$a$ to 10 $\mu$m or less.

Next, preferred examples of the core material, the clad material, and the coating material in the integrally molded multi-optical transmission sheet 10 will be described. These transparent plastic materials can be manufactured by methods known in the art. Generally, the core material and the clad material are required to transmit light, and thus are preferably materials that are transparent in the wavelength band of the light source to be used and have few foreign substances, and those are not particularly limited, and examples thereof include a perfluorinated resin material, a partially fluorinated resin material, as partially chlorinated resin material, and an acrylic material. Further, a partially deuterated resin in which hydrogen atoms in the resin are substituted with deuterium atoms may be used. A transparent and low-cost acrylic material, polycarbonate material or the like is used as the coating material, but is not limited thereto. These plastic materials can be manufactured using a general polymerization method in which a monomer is used for polymerization. Examples of the polymerization method include solution polymerization, bulk polymerization, emulsion polymerization, and suspension polymerization. Among them, the bulk polymerization method is preferable from the viewpoint of preventing the inclusion of foreign matters and impurities.

The polymerization temperature at this time is not particularly limited, and is suitably approximately from 80° C. to 150° C., for example. The reaction time can be appropriately adjusted depending on the amount and type of monomer, the amount of a polymerization initiator, a chain transfer agent, which will be described later, the reaction temperature and the like, and is suitably approximately from 20 to 60 hours.

As the perfluorinated material, the product names TEFRON-AF (DuPont), Hyflon AD (Solvay), and CYTOP (Asahi Glass Co., Ltd.) can be generally used. Further, a perfluorinated polymer obtained by copolymerizing these main ring structures with tetrafluoroethylene or the like may be used. Further, a perfluorinated polymer having a dioxolene skeleton can also be used.

Examples of the polymer constituting the core region include substances in which a part of the hydrogen atoms of the C—H bond of monomers are chlorine-substituted, fluorine-substituted, or deuterium-substituted. Examples of the monomers include a (meth)acrylic acid ester compound such as ethyl methacrylate, n-propyl methacrylate, n-butyl methacrylate, ethyl acrylate, n-propyl acrylate, and n-butyl acrylate; a styrene-based compound such as styrene, $\alpha$-methylstyrene, chlorostyrene, and bromostyrene; vinyl esters such as vinyl acetate, vinyl benzoate, vinyl phenyl acetate, and vinyl chloroacetate; and maleimides such as N-n-butylmaleimide, N-tert-butylmaleimide, N-isopropylmaleimide, and N-cyclohexylmaleimide.

When producing the polymer, it is preferable to use a polymerization initiator and/or a chain transfer agent. Examples of the polymerization initiator include ordinary radical initiators. Examples thereof include peroxide-based compounds such as benzoyl peroxide, t-butylperoxy-2-ethylhexanate, di-t-butylperoxide, t-butylperoxyisopropyl carbonate, and n-butyl 4,4,bis(t-butylperoxy) valalate; and azo-based compounds such as 2,2'-azobisisobutyronitrile, 2,2'-azobis(2-methylbutyronitrile), 1,1'-azobis(cyclohexane-1-carbonitrile), 2,2'-azobis(2-methylpropane), 2,2'-azobis(2-methylbutane), 2,2'-azobis(2-methylpentane), 2,2'-azobis(2, 3-dimethylbutane), 2,2'-azobis(2-methylhexane), 2,2'- azobis(2,4-dimethylpentane), 2,2'-azobis(2,3,3-trimethylbu-tane), 2,2'-azobis(2,4,4-trimethylpentane), 3,3'-azobis(3-methylpentane), 3,3'-azobis(3-methylhexane), 3,3'-azobis(3,4-dimethylpentane), 3,3'-azobis(3-ethylpentane), dimethyl-2,2'-azobis(2-methylpropionate), diethyl-2,2'-azobis(2-methylpropionate)), and di-t-butyl-2,2'-azobis(2-methylpropionate). These may be used alone or in combination of two or more.

It is suitable to use the polymerization initiator in an amount of approximately from 0.01% to 2% by weight based on all the monomers. The chain transfer agent is not particularly limited, and known ones can be used. Examples thereof include alkyl mercaptans (n-butyl mercaptan, n-pen-tyl mercaptan, n-octyl mercaptan, n-lauryl mercaptan, and t-dodecyl mercaptan), and thiophenols (thiophenol, m-bro-mothiophenol, p-bromothiophenol, m-toluenethiol, and p-toluenethiol). Among them, alkyl mercaptans such as n-butyl mercaptan, n-octyl mercaptan, n-lauryl mercaptan, and t-dodecyl mercaptan are preferably used. Further, a chain transfer agent in which a hydrogen atom of C—H bond is substituted with a deuterium atom or a fluorine atom may be used. These may be used alone or in combination of two or more.

The chain transfer agent is usually used to adjust the molecular weight to an appropriate value in terms of mold-ing and physical properties. The chain transfer constant of the chain transfer agent for each monomer can be obtained by experiment with reference to, for example, Polymer Handbook, 3rd Edition (edited by J. BRANDRUP and EHIMMERGUT, published by JOHN WILEY&SON) "Experimental Method for Polymer Synthesis" (written by Takayuki Otsu and Masayoshi Kinoshita, published by Kagaku-Dojin, in 1972). Therefore, in consideration of the chain transfer constant, it is preferable to appropriately adjust the type and the addition amount according to the type of the monomer. For example, it may be approximately from 0.1 to 4 parts by weight with respect to 100 parts by weight of all the monomer components.

The polymer constituting the core region 12a and/or the clad region 12b is suitable to have a weight average molecu-lar weight of approximately from 50,000 to 300,000, and preferably approximately from 100,000 to 250,000. This is to ensure appropriate flexibility and transparency. The core region 12a and the clad region 12b may have different molecular weights, for example, for viscosity adjustment. The weight average molecular weight refers to a polysty-rene-equivalent value measured by gel permeation chroma-tography (GPC), for example.

If necessary, a compounding agent, for example, a heat stabilization aid, a processing aid, a heat resistance improver, an antioxidant, and a light stabilizer may be added to the polymer constituting the integrally molded multi-optical transmission sheet 10 within the range not impairing the performance such as the transparency for optical trans-mission and heat resistance. These can be used alone or in combination of two or more, and examples of the method for mixing these blends with a monomer or a polymer include a hot blending method, a cold blending method, a solution mixing method and the like.

Synthesis of
perfluoro-4-methyl-2-methylene-1,3-dioxolane 2-chloro-1-propanol, 1-chloro-2-propanol, and methyl tri-fluoropyruvate are dehydrated and condensed to obtain a purified product of 2-carbomethyl-2-trifluoromethyl-4-methyl-1,3-dioxolane. Next, fluorination of perfluoro-4- methyl-2-methylene-1,3-dioxolane is performed. Using 1,1,2-trichlorotrifluoroethane as a solvent, nitrogen gas and fluorine gas were each caused to flow at a constant flow rate, and under the atmosphere of nitrogen/fluorine, fluorination was performed by slowly adding the 2-carbomethyl-2-trif-luoromethyl-4-methyl-1,3-dioxolane prepared above to the reaction tank to obtain perfluoro-2,4-dimethyl-1,3-dioxo-lane-2-carboxylic acid is obtained. The above distillate is neutralized with an aqueous potassium hydroxide solution to obtain perfluoro-2,4-dimethyl-2-carboxylate potassium-1,3-dioxolane. The potassium salt is dried under vacuum, and the salt is decomposed under an argon atmosphere to obtain perfluoro-4-methyl-2-methylene-1,3-dioxolane. The obtained perfluoro-4-methyl-2-methylene-1,3-dioxolane and perfluorobenzoyl peroxide are put into a glass tube, degassed with a freeze/thaw vacuum machine, then refilled with argon, and heated for several hours. The contents become solid and a transparent polymer is obtained. The polymer can be used to manufacture an integrally molded multi-optical transmission sheet 10.

The viscosity of a fluorine-containing polymer (including perfluorinated or partially fluorinated material) in the molten state is preferably from 103 to 105 poises at a melting temperature of from 200° C. to 300° C. If melt viscosity is excessively high, not only is it difficult to form the core region 12a and the clad region 12b, but also the diffusion of dopant necessary for forming the refractive index distribu-tion is less likely to occur, which makes it difficult to form the refractive index distribution. Further, if the melt viscos-ity is excessively low, a problem will occur in practical use. That is, when it is used as the optical transmission body in electronic devices, automobiles, and the like, it is exposed to high temperatures and softened, and the optical transmission performance deteriorates.

The number average molecular weight of the fluorine-containing polymer is preferably from 10,000 to 5,000,000, and more preferably 50,000 to 1,000,000. If the molecular weight is excessively small, heat resistance may be impaired, and if it is excessively large, it becomes difficult to form an optical transmission body having a refractive index distribution, which is not preferable.

When a partially chlorinated material is used as the core material of the integrally molded multi-optical transmission sheet 10, it can be synthesized by the same method as the above-mentioned method for synthesizing a perfluorinated material which is a general preparing method.

Synthesis of partially chlorinated material (Refer to Japa-nese Patent No. 5419815)

Next, a method for preparing the partially chlorinated material will be briefly described. Pre-distilled and purified trichloroethyl methacrylate, sublimated and purified cyclo-hexylmaleimide, and diphenyl sulfide as a dopant of the refractive index imparting agent were precisely weighed and put into a glass container. Further, ditertiary butyl peroxide as a polymerization initiator and normal-lauryl mercaptan as a chain transfer agent are added in predetermined amounts with respect to the concentration in the total weight. After thoroughly mixing this solution, the solution is passed through a membrane filter having a pore size to be put into a glass polymerization container for filtration. Next, while introducing argon gas into a glass polymerization tube containing this solution, dissolved air is removed by the freeze degassing method. The glass polymerization tube is put in an oven and the temperature of the polymerization container is raised while introducing argon gas to polymer-ize the monomer, and the temperature is further raised to complete the polymerization reaction. The glass tube is opened to obtain a solidified transparent polymerized rod.

If the solubility parameter of the dopant is equal and compatible with the solubility parameter of the polymer, the dopant is evenly present within a polymer matrix. On the other hand, as a difference in the solubility parameter between the dopant and the polymer increases, the tendency of the dopants to aggregate with each other increases, and a refractive index inhomogeneous structure due to the concentration distribution of the dopant is formed. In addition to the finding of general solubility parameter, the microscopic concentration distribution of the dopant can also be formed by adding local interaction between the dopant and the polymer (for example, corresponding secondary electron polarization between specific functional groups). As the dopant for the perfluorinated core material, a substance having a higher refractive index than that of the perfluorinated polymer is usually used. That is, the substance dopant is a substance having substantially no C—H bond for the same reason as in the perfluoropolymerization, and it is more preferable that the substance dopant has a refractive index larger than that of the perfluoropolymer by 0.05 or more. When the refractive index is higher, the content of the dopant necessary for forming the desired refractive index distribution may be smaller, and thus the glass transition temperature is less likely to decrease, and as a result, since the heat resistance of the optical fiber is increased, 0.1 or more is particularly preferable.

The dopant is preferably a low-molecular compound, an oligomer, or a polymer which has an aromatic ring such as a benzene ring, a halogen atom such as chlorine, bromine, or iodine, or a bonding group such as an ether bond, and in a case of the polymer, a compound having an excessively large molecular weight is not preferable because the compatibility with the perfluorinated polymer is lowered, resulting in a large light scattering loss. On the contrary, in the case of a compound having a small molecular weight, the glass transition temperature in the mixture with the fluorine-containing polymer becomes low and thus a decrease in the heat resistant temperature of the optical fiber is caused, which is not preferable. Therefore, the number average molecular weight of the dopant is preferably $3 \times 10^2$ to $2 \times 10^3$, and more preferably $3 \times 10^2$ to $1 \times 10^3$.

Specific compounds of the dopant include an oligomer which is a 5- to 8-mer of chlorotrifluoroethylene, an oligomer which is a 5- to 8-mer of dichlorodifluoroethylene, or an oligomer which is a 2- to 5-mer obtained by obtained by polymerizing a monomer that gives an oligomer having a high refractive index (for example, a monomer having a chlorine atom) among the monomers forming the perfluoropolymer, as described in Japanese Laid-open Patent Publication No. H08-005848.

In addition to a halogen-containing aliphatic compound such as the above-described oligomer, a halogenated aromatic hydrocarbon containing no hydrogen atom bonded to a carbon atom or a halogen-containing polycyclic compound can be used. In particular, a fluorinated aromatic hydrocarbon or a fluorine-containing polycyclic compound containing only a fluorine atom as a halogen atom (or containing a relatively small number of chlorine atoms and a fluorine atom) is preferable in terms of the compatibility with the fluorine-containing polymer. It is more preferable that these halogenated aromatic hydrocarbons and halogen-containing polycyclic compounds do not have polar functional groups such as a carbonyl group and a cyano group.

Examples of such a halogenated aromatic hydrocarbon include a compound represented by, for example, formula $\Phi r-Zb$ [$\Phi r$ is a b-valent fluorinated aromatic ring residue in which all hydrogen atoms are substituted with a fluorine atom, Z is a halogen atom other than fluorine, —Rf, —CO—Rf, —O—Rf, or —CN. Here, Rf is a perfluoroalkyl group, a polyfluoroperhaloalkyl group, or a monovalent $\Phi r$. b is an integer of 0 or 1 or more.]. The aromatic ring includes a benzene ring and a naphthalene ring. The perfluoroalkyl group or polyfluoroperhaloalkyl group which is Rf preferably has 5 or less carbon atoms. As a halogen atom other than fluorine, a chlorine atom or a bromine atom is preferable. Specific compounds thereof include 1,3-dibromotetrafluorobenzene, 1,4-dibromotetrafluorobenzene, 2-bromotetrafluorobenzotrifluoride, clopentafluorobenzene, bromopentafluorobenzene, iodopentafluorobenzene, decafluorobenzophenone, perfluoroacetophenone, perfluorobiphenyl, chloroheptafluoronaphthalene, and bromoheptafluoronaphthalene. Examples of particularly preferable dopants as an example of the fluorine-containing polycyclic compound include a chlorotrifluoroethylene oligomer, perfluoro(triphenyltriazine), perfluoroterphenyl, perfluoroquatrophenyl, perfluoro(triphenylbenzene), and perfluoroanthracene, from the viewpoint of having good compatibility with a perfluorinated polymer, particularly, a fluorine-containing polymer having a ring structure in the main chain, and good heat resistance. Since the compatibility is good, a substance to be mixed with the fluorine-containing polymer, particularly, a fluorine-containing polymer having a ring structure in the main chain can be heated and melted at from 200° C. to 300° C. so as to be easily mixed. Moreover, both can be mixed uniformly by dissolving and mixing in a fluorine-containing solvent and then removing the solvent.

Examples of the dopant used in the partially chlorinated or partially fluorinated core material include low molecular weight compounds or compounds in which hydrogen atoms present in these compounds are substituted with deuterium atoms. Examples of the low molecular weight compounds having a high refractive index include sulfur compounds such as diphenylsulfone (DPSO), diphenylsulfone derivatives (for example, diphenyl sulfone chloride such as 4,4'-dichlorodiphenylsulfone and 3,3',4,4'-tetrachlorodiphenylsulfone), diphenyl sulfide (DPS), diphenyl sulfoxide, dibenzothiophene, and dithiane derivatives; phosphate compounds such as triphenyl phosphate (TPP) and tricresyl phosphate; benzyl benzoate; benzyl n-butyl phthalate; diphenyl phthalate; biphenyl; and diphenylmethane. Examples of the low molecular weight compound having a low refractive index include tris-2-ethylhexyl phosphate (TOP). These may be used alone or in combination of two or more. Further, decafluorobiphenyl, perfluorodiphenyl sulfide, and perfluorotriazine can be used as the dopant.

In order to make it easy to form a microscopic inhomogeneous structure, the temperature and the extrusion speed at the time of forming the integrally molded multi-optical transmission sheet 10 may be controlled.

It is also possible to form a microscopic inhomogeneous structure by a heat treatment step after coextruding the core material, the clad material, and the coating material. For example, when quenching is performed after coextrusion, the polymer is brought into a glass state with a large volume before the enthalpy relaxation of the polymer occurs. On the other hand, when the heat treatment step is sufficiently performed near the glass transition temperature, the volume is slightly reduced due to the enthalpy relaxation. When the enthalpy relaxation is formed in the microscopic region, it forms a so-called microscopic inhomogeneous structure. Further, if an extending step is further added after coextrusion, the molecules of the melt-extruded fiber receive orientation, and orientation birefringence occurs due to the orientation degree. The orientation birefringence causes birefringence not only in the extending direction of the optical transmission region but also in the radial direction and the peculiar direction as a result. This birefringent structure also promotes mode coupling.

An integrally molded multi-optical transmission sheet can be manufactured using a manufacturing apparatus similar to the manufacturing apparatus illustrated in FIG. 2. As the core material, CYTOP (Asahi Glass Co., Ltd.) containing a predetermined amount of decafluorobiphenyl as a refractive index imparting material can be used as a raw material from a preform rod. As the clad material, CYTOP containing no refractive index imparting material can be used. A polycarbonate (product name: Xylex 7200 available from Sabic) resin can be used as a coating material. A general screw type extruder may be used as an extruder for each material, but is not limited to a screw, and the molding method using high pressure gas, for example, nitrogen gas, argon gas, or gas such as air is not limited as well. As illustrated in FIG. 3(*b*), the T-die used here is an extremely important component in making the desired integrally molded multi-optical transmission sheet, and the accuracy of the integrally molded multi-optical transmission sheet is determined by the accuracy of the structure of T-die. The structure of this T-die is completely different from a so-called general T-die. That is, the T-die to be used has a structure in which three kinds of resins, that is, the resin of the core material, the resin of the clad material, and the resin of the coating material for protecting the same are melted and pass through independent flow paths. In particular, since the flow path for the core material and the flow path for the clad material have a double structure, processing accuracy is particularly required. Further, by adjusting the length of the flow path for the core material, the concentration distribution of the dopant in the core radial direction, that is, the refractive index distribution (GI distribution shape) in the core radial direction is determined. FIG. 3(*b*) illustrates a flow path P1 of the core material and the clad material, and each of the flow paths P1 is accurately arranged in the T-die 1005. In addition, as indicated by the direction D2 in FIG. 3, the accuracy of the interval between the one flow path P1 and the adjacent flow path P1 is also extremely important, and the interval between the flow paths P1 in the direction D2 is designed to become a constant interval at any point. In this way, an extremely accurate T-die for integrally molded multi-optical transmission sheet is made. The material of the T-die may be SUS type in terms of easy process, or may be Hastelloy which has corrosion resistance at high temperature.

These materials are supplied to a hopper portion of the extruder, melted at approximately from 200° C. to 230° C., supplied to the die, and coextruded from the T-die so as to obtain a sheet-like body with a uniform thickness. This sheet-like body has a width of approximately 1 cm and a thickness of approximately 1.5 mm. Further, by extending the sheet-like body with an extension roll approximately 8 times, a thin integrally molded multi-optical transmission sheet having a width of 1 mm and a thickness of approximately 170 μm can be obtained. When the cross section of the integrally molded multi-optical transmission sheet is checked, an optical transmission region having eight core regions and clad regions is formed. It can also be checked that a GI type refractive index distribution is provided from the center of the core region to the clad region. As a result of making the light incident on the eight core regions and measuring the emission intensity, it can be checked that there is no crosstalk. Also, when the M² value is measured by cutting this integrally molded multi-optical transmission sheet to a length of 1 m, it can be checked that all eight optical transmission regions are 1.8.

An integrally molded multi-optical transmission sheet having four cores was manufactured using a manufacturing apparatus similar to the manufacturing apparatus illustrated in FIG. 2. As described above, as the core material, CYTOP (Asahi Glass Co., Ltd.) containing a predetermined amount of decafluorobiphenyl as a refractive index imparting material was used as a raw material from a preform rod. As the clad material, CYTOP containing no refractive index imparting material was used. A polycarbonate (product name: Xylex 7200 available from Sabic) resin was used as a coating material. In order to extrude the above materials all at once, melt extrusion molding was performed using high-pressure nitrogen gas.

These resin materials are supplied to the core and clad hopper of the extruder, respectively, and the core portion is heated at approximately from 210° C. to 230° C. by a band heater, and similarly, the clad portion is also heated at approximately from 220° C. to 230° C. to melt the resin inside. The resin was uniformly heated and melted, and allowed to stand for a certain period of time to be stabilized. After that, nitrogen gas was supplied at a pressure of 0.5 MPa on average from a nitrogen gas introduction portion connected to an upper portion of a supply portion of the core and clad, and coextrusion was performed. A sheet-like material was obtained by extending and cooling the resin discharged from the T-die. This sheet-like material had a width of approximately 1 mm and a thickness of approximately 600 μm and was uniform in the length direction. As a result of checking the cross section of the sheet-like material, it was checked that the four cores were linearly arranged at intervals of 250 μm, which is an integrally molded multi-optical transmission sheet having four cores. In addition, it was checked that the core diameters of the four cores were all approximately 30 μm, and a GI type refractive index distribution was provided from the center of the core region to the clad region.

An integrally molded multi-optical transmission sheet having a core with a core diameter of 10 μm or less was also manufactured by gradually reducing the pressure of the nitrogen gas from 0.5 MPa to 0.1 MPa. This means that a single-mode waveguide as well as a multi-mode waveguide can be easily manufactured in the integrally molded multi-optical transmission sheet. It goes without saying that the control of the core diameter can be achieved not only by controlling the pressure but also by combining it with various stretching conditions. For example, an integrally molded multi-optical transmission sheet that includes a single-mode waveguide having a staircase distribution (SI type) in the refractive index distribution of the substantial core and clad is manufactured by using a manufacturing method such as quenching without including a diffusion step region after melt extrusion. An example of the refractive index difference between the core material (perfluorinated polymer+dopant) and the clad material (only perfluorinated polymer) used in this production example is approximately 0.005. In the case of SI type, if the core diameter is 10 μm or less, the single mode condition is satisfied at a predetermined wavelength, for example, a light source wavelength of 1550 nm. In the case of the GI type having the same refractive index difference, the single mode condition is satisfied with a larger core diameter.

Figure 14:
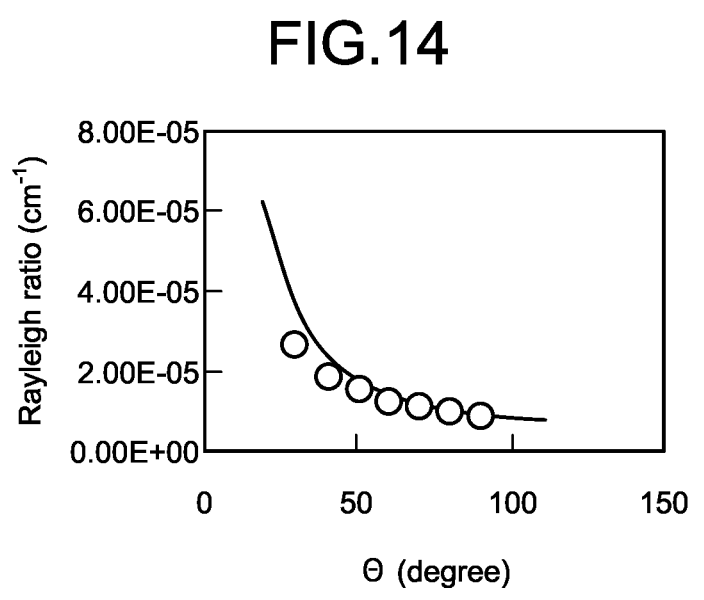

Further, the angle dependence of the light scattering intensity was measured using the rod of the above core material. In addition, as a comparative example, the angle dependence of the light scattering intensity was measured using a silica glass optical fiber preform. Then, as illustrated in FIG. 14 for the example, it was found that in the comparative example, the scattered light intensity was extremely weak, detection was difficult, and there was no microscopic inhomogeneous structure. From the results of FIG. 14, it was calculated that the correlation length was 590 angstroms and the relative dielectric constant fluctuation was $5.8 \times 10^{-12}$ in the example.

Figure 15:
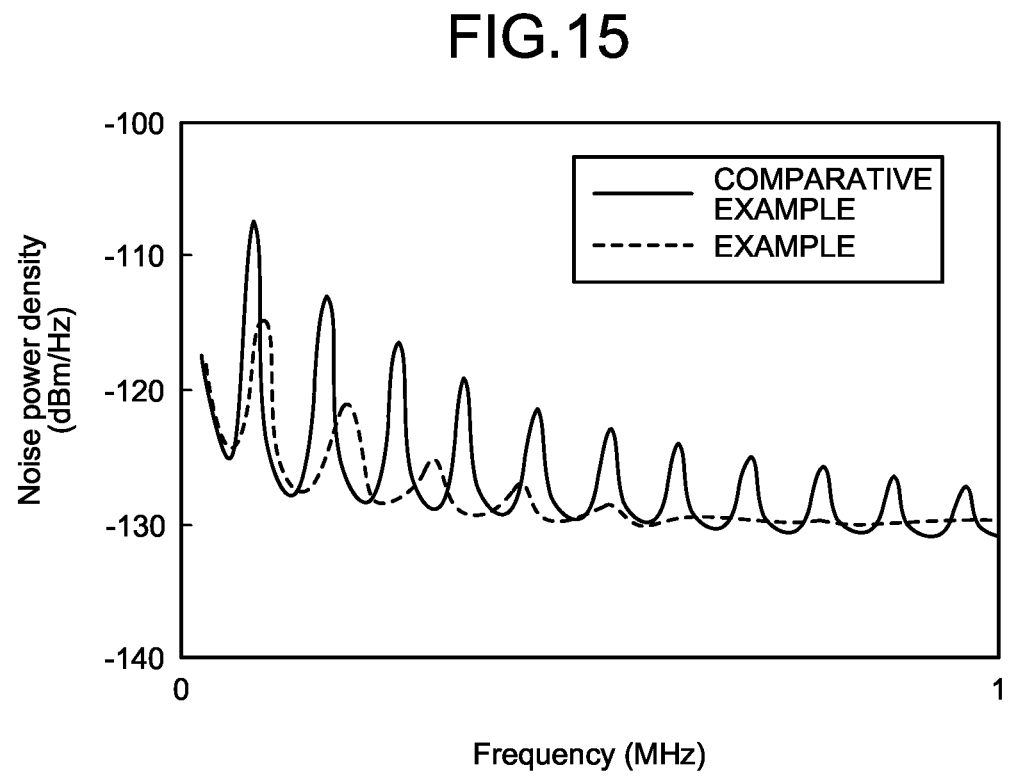

The integrally molded multi-optical transmission sheet of Example 1, the silica glass-based GI type MMF of the comparative example manufactured from the silica glass-based optical fiber preform was cut out by 1 m, and was measured in the experimental system illustrated in FIG. 12, and as a result, a noise power density spectrum became as illustrated in FIG. 15. That is, the maximum noise power density was −114 dBm/Hz and less than −108 dBm/Hz in the example, and was −108 dBm/Hz in the comparative example.

Subsequently, a bit error rate (BER) measuring device was added to the experimental system of FIG. 12, the VCSEL 301 was directly modulated with a 10 Gbps NRZ pseudo-random pattern signal, the laser light L was generated as a laser signal light, the laser signal light was propagated using the integrally molded multi-optical transmission sheet of the example and the optical fiber of the comparative example as the optical transmission body 303, and then the light was received by the PD 305 to measure a BER. As a result, the $\text{Log}_{10}$ (BER) value for a length of 1 m was −7.14 in the example; whereas, it was −6.00 in the comparative example, which was not good.

As described above, according to the present invention, it has been found that it is possible to realize an integrally molded multi-optical transmission sheet that has a small maximum noise power density, is capable of realizing high-quality high-speed signal transmission for short distance, and achieving high workability when connecting to another optical element.

INDUSTRIAL APPLICABILITY

The present invention is suitable for high-speed signal transmission.

REFERENCE SIGNS LIST

10, 10A, 10B, 10C INTEGRALLY MOLDED MULTI-OPTICAL TRANSMISSION SHEET
11 COATED PORTION
12 OPTICAL TRANSMISSION REGION
12*a* CORE REGION
12*b* CLAD REGION
41 FERRULE
50 INTEGRALLY MOLDED MULTI-OPTICAL TRANSMISSION SHEET CONNECTOR

The invention claimed is:

1. An integrally molded multi-optical transmission sheet comprising:
a sheet-like coated portion formed of plastic; and
a plurality of optical transmission regions, provided inside the coated portion to extend along an extending direction of the coated portion, having a core region formed of first plastic, and a clad region formed of second plastic and surrounding an outer periphery of the core region, wherein the plurality of optical transmission regions are arranged in a row substantially parallel to each other along a main surface of the coated portion, and
wherein the first plastic and the second plastic are selected such that in a case where light is incident from one end face side of the plurality of optical transmission regions and transmitted toward another end face side, a $M^2$ value of emitted light is 1.7 or more.

2. The integrally molded multi-optical transmission sheet according to claim 1, wherein the $M^2$ value is 5.0 or less.

3. The integrally molded multi-optical transmission sheet according to claim 1, wherein the plurality of optical transmission regions are arranged at a predetermined distance at substantially equal intervals.

4. The integrally molded multi-optical transmission sheet according to claim 1, wherein the predetermined distance is equal to an arrangement distance of a plurality of light sources that emit light to be incident on the respective optical transmission regions.

5. The integrally molded multi-optical transmission sheet according to claim 1, wherein the core region has a graded index type refractive index distribution.

6. The integrally molded multi-optical transmission sheet according to claim 1, wherein the core region is formed of a perfluorinated material, a partially fluorinated material, a partially chlorinated material, or a partially deuterated material.

7. The integrally molded multi-optical transmission sheet according to claim 1, further comprising:
a microlens array provided on the end face.

8. The integrally molded multi-optical transmission sheet according to claim 1, further comprising a coating layer provided on the end face.

9. An integrally molded multi-optical transmission sheet connector comprising:
the integrally molded multi-optical transmission sheet according to claim 1; and
a ferrule having an insertion hole having an inner shape corresponding to an outer shape of a cross section of the integrally molded multi-optical transmission sheet,
wherein at least one end of the integrally molded multi-optical transmission sheet is inserted into the insertion hole.

10. The integrally molded multi-optical transmission sheet according to claim 1, wherein the core region is formed of a core material with microscopic inhomogeneous correlation length of 100 angstroms or more.

11. An integrally molded multi-optical transmission sheet comprising:
a sheet-like coated portion formed of plastic; and
a plurality of optical transmission regions, provided inside the coated portion to extend along an extending direction of the coated portion, having a core region formed of first plastic, and a clad region formed of second plastic and surrounding an outer periphery of the core region,
wherein the plurality of optical transmission regions are arranged in a row substantially parallel to each other along a main surface of the coated portion, and
wherein the first plastic and the second plastic are selected such that in a case where light is incident from one end face side of the plurality of optical transmission regions and transmitted toward another end face side, when the light output from the another end face side is received by a light receiving element and converted into an electric signal, a maximum noise power density in a low frequency region of a noise spectrum of the electric signal is less than −108 dBm/Hz.

12. An integrally molded multi-optical transmission sheet comprising:

a sheet-like coated portion formed of plastic; and a plurality of optical transmission regions, provided inside the coated portion to extend along an extending direction of the coated portion, having a core region formed of plastic, and a clad region formed of plastic and surrounding an outer periphery of the core region, wherein the plurality of optical transmission regions are arranged in a row substantially parallel to each other along a main surface of the coated portion, and the core region of the plurality of the optical transmission regions is formed of a core material with microscopic inhomogeneous correlation length of 100 angstroms or more, and satisfies a single mode condition at a predetermined wavelength.

* * * * *